United States Patent [19]
Williams

[11] Patent Number: 5,335,226
[45] Date of Patent: Aug. 2, 1994

[54] COMMUNICATIONS SYSTEM WITH RELIABLE COLLISION DETECTION METHOD AND APPARATUS

[75] Inventor: Richard A. Williams, Leominster, Mass.

[73] Assignee: Digital Equipment Corporation, Maynard, Mass.

[21] Appl. No.: 900,619

[22] Filed: Jun. 18, 1992

[51] Int. Cl.$^5$ ............................................. H04J 3/02
[52] U.S. Cl. .................... 370/85.2; 370/85.1
[58] Field of Search ................ 370/85.1, 85.2, 85.3, 370/85.5, 80, 94.1, 60, 60.1; 340/825.5, 825.51

[56] References Cited
U.S. PATENT DOCUMENTS

| | | | |
|---|---|---|---|
| 4,063,220 | 12/1977 | Metcalf et al. | 340/147 LP |
| 4,210,780 | 7/1980 | Hopkins et al. | 370/80 |
| 4,584,678 | 4/1986 | Ozeki et al. | 370/85 |
| 4,811,338 | 3/1989 | Haruyama et al. | 370/85.2 |
| 4,888,763 | 12/1989 | Hatfield et al. | 370/85.2 |
| 5,012,467 | 4/1991 | Crane | 370/85.3 |
| 5,065,153 | 11/1991 | Tomita et al. | 370/85.2 |
| 5,086,427 | 2/1992 | Whittaker et al. | 370/85.2 |
| 5,132,967 | 7/1992 | Kalajainen | 370/85.2 |

OTHER PUBLICATIONS

Joseph Mazor and Robert Galin, *Monolithic controller builds PC network without toil or trouble*, Electronic Design, Dec. 13, 1984, pp. 141 to 152.

*Draft Supplement to ANSI/IEEE Std. 802.3–1990, Type 10Base-F*, published by IEEE Stds., 445 Hoes Lane, Piscataway, New Jersey 08854, 1991, pp. 16-1 through 16-8.

*Primary Examiner*—Douglas W. Olms
*Assistant Examiner*—Dang Ton
*Attorney, Agent, or Firm*—David A. Dagg; A. Sidney Johnston; Albert P. Cefalo

[57] ABSTRACT

A communications system having a plurality of nodes is disclosed, including a reliable method and apparatus for collision detection. Each node includes a primary and a secondary collision detection circuit, and a unique value that is included in each transmission. The unique values of the nodes are designed so that collisions not detected by the primary collision detection circuit are reliably detected by the secondary collision detection circuit, even in the presence of logic delays within the circuits, and propagation delays between nodes.

21 Claims, 10 Drawing Sheets

| 90 | 92 | |
|---|---|---|
| 1 | 4 | 45 |
| 2 | 6 | 43 |
| 3 | 8 | 41 |
| 4 | 10 | 39 |
| 5 | 12 | 37 |
| 6 | 14 | 35 |
| 7 | 16 | 33 |
| 8 | 18 | 31 |
| 9 | 20 | 29 |
| 10 | 22 | 27 |
| 11 | 11 | 28 |
| 12 | 9 | 30 |
| 13 | 7 | 32 |
| 14 | 5 | 34 |
| 15 | 3 | 36 |
| 16 | 23 | 38 |
| 17 | 21 | 40 |
| 18 | 19 | 42 |
| 19 | 17 | 44 |
| 20 | 15 | 46 |

COMMUNICATIONS SYSTEM WITH RELIABLE COLLISION DETECTION METHOD AND APPARATUS

FIELD OF THE INVENTION

The invention relates generally to communications systems, and more particularly to collision detection systems.

BACKGROUND

Collision avoidance is used to prevent a network node from beginning a transmission on a communications medium while another node is already transmitting on the communications medium. Collision detection is used to halt transmissions when multiple nodes inadvertently transmit on the communications medium simultaneously. Known collision detection methods for bus topology networks compare the data being transmitted with data being simultaneously received at the transmitting node, and report collisions when a mismatch is detected.

Difficulties in collision avoidance and collision detection arise because of propagation delay of signals on the communications medium, and logic delays within the collision detection circuits. These delays result in nodes transmitting simultaneously, and time shifting of the simultaneous transmissions. Time shifting of concurrent transmissions may cause the combined signal of simultaneous dissimilar transmissions to appear identical to the original transmissions of each transmitting node.

Furthermore, asynchronous colliding transmissions may result in the signal transitions of a first transmission occurring during the sampling period of a second transmission. The interpretation of this combined signal by each transmitting node is indeterminate, and may cause the combined signal of simultaneous dissimilar transmissions to appear identical to the original transmission at each concurrently transmitting node. Known collision detection methods relying on data comparison at each transmitting node fail under such circumstances.

In typical CSMA/CD (Carrier Sense Multiple Access with Collision Detection) systems, each node is assigned a unique node address. All transmissions between nodes contain the node address of the transmitting node in the source address field of the transmission, therefore any two concurrent transmissions differ by at least a single bit. However, the format and design of the node address does not account for time shifting of concurrent transmissions, or difficulties in interpretation of asynchronous colliding transmissions. The node address format defines two sub-fields: the company code, and the node specific field. Each sub-field is 24 bits in length. The company code field contains a value assigned to the node's manufacturer. For example, all nodes manufactured by Digital Equipment Corporation contain the value 08-00-2b in the company code sub-field of the source address field. When communications systems include many nodes from the same manufacturer, the unique portion of the source address field is only 24 bits out of the 48 bit source address field. In this 24 bit sub-field, there is at least a one bit difference between any two simultaneous data transmissions. Time shifting of concurrent transmissions, or problems with interpretation of asynchronous colliding transmissions may cause this differentiating bit to be ineffective, and as a result, collisions may go undetected.

"Draft Supplement to ANSI/IEEE Std. 802.3-1990, Type 10Base-F" ("10Base-F"), published by IEEE Stds., 445 Hoes Lane, Piscataway, N.J. 08854, 1991, at page 16-4, all disclosures of which are herein incorporated by reference, assigns a second unique value to each node in the communications system, included as the first 32 bits of every transmission. "10Base-F" is IEEE terminology for a CSMA/CD implementation, where the first two digits indicate a 10 megabit per second data rate, the next four letters indicate baseband signalling, and the final letter indicates that the communications medium is fiber optic cable. The unique value field added by 10Base-F requires costly additional circuitry in each node, not included in standard CSMA/CD circuits. To process the 10Base-F unique value field, nodes must include logic to insert the unique value field into every transmission, compare the transmitted unique value field with the received signal, and remove received unique value fields before the transmission is passed to standard CSMA/CD circuitry.

It is desirable to have an economical collision detection mechanism which reliably detects collisions in the presence of asynchronous simultaneous transmissions transitioning during the sampling period of the station, and which reliably detects collisions despite time shifting of concurrent transmissions caused by the propagation delay of the communications medium, or logic delays within the collision detection circuits, that is compatible with standard CSMA/CD circuits, and does not require costly additional circuitry.

SUMMARY

In accordance with principles of the invention, there is provided a communications system, where each node includes a primary and a secondary collision detection circuit, and where each node is assigned a unique value that is included in each transmission. The unique values of the nodes are designed so that collisions not detected by a primary collision detection method are reliably detected by a secondary collision detection method.

The primary collision detection circuit detects collisions when a node's receiver becomes active between the time when the node determines the channel to be quiet, and when the node subsequently begins transmission. The secondary collision detection circuit detects collisions when it finds a mismatch between the transmitted data and the simultaneously received data.

The unique values are designed such that for any two concurrent transmissions, at least one recessive bit in each transmission is transmitted when no other recessive bit is being transmitted, separated from any recessive bit in the concurring transmissions by at least one dominant bit, when the concurrent transmissions are time shifted by any number of bits from zero up to the maximum time shift possible for concurrent transmissions not detected as collisions by the primary collision detection circuit. In this way, the likelihood of a collision being undetected is reduced, and a significant improvement in network reliability is achieved.

These and other features and advantages of the present invention will become apparent from a reading of the detailed description in conjunction with the attached drawings in which like reference numerals refer to like elements in the several views.

DETAILED DESCRIPTION

In communications systems, where many nodes share a communications channel, a protocol allowing fair and efficient use of the communications channel is desirable. The CSMA/CD protocol is known to provide sufficiently fair and efficient sharing of the communications channel to meet the requirements of many systems. CSMA/CD is a contention based protocol. A contention based protocol permits a node to gain access to the entire channel bandwidth for each data transmission. A first node wishing to transmit waits until no other nodes are transmitting before transmitting. If a second node's transmission reaches the first node after the first node determines the channel is quiet, a collision occurs. Transmitting nodes detect collisions by listening to the communications channel while they are transmitting. When a collision occurs, the signal received by the concurrently transmitting nodes is a combination of the concurrent transmissions. When a collision is detected, transmitting nodes cease transmission, and retransmit their data later.

Figure 1:
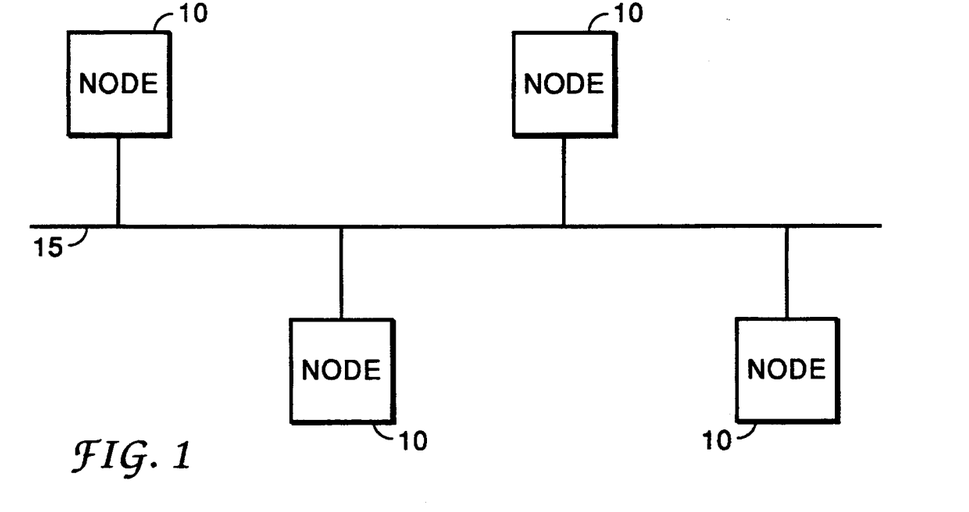
FIG. 1 is a block diagram of a bus topology CSMA/CD communications system.

FIG. 1 shows a bus topology CSMA/CD communications system including network nodes 10, each one of network nodes 10 being coupled with a shared communications medium 15. During operation, the network nodes 10 exchange data over the communications medium 15. CSMA/CD is used to allocate the bandwidth of the communications medium 15 among the network nodes 10. When two or more of the nodes 10 transmit concurrently, a collision occurs. Undetected collisions may result in lost transmissions, costly retransmissions and broken connections between nodes. For the network to perform efficiently, collisions must reliably be detected.

Figure 2:
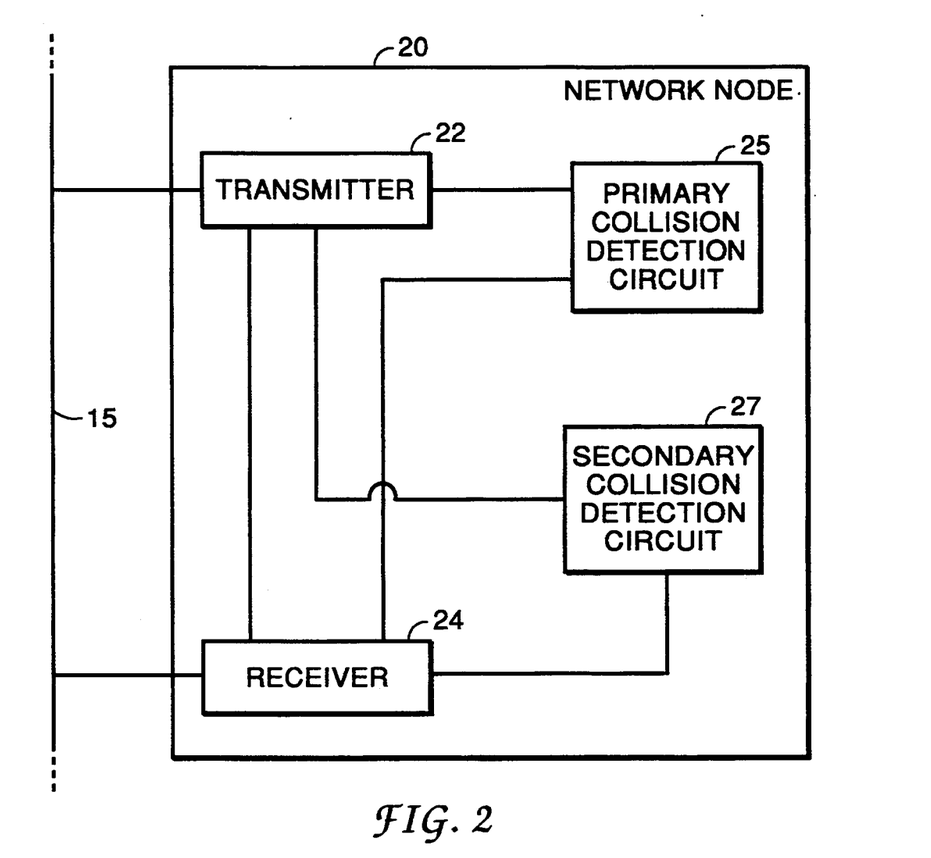
FIG. 2 is a block diagram of a network node.

FIG. 2 shows a network node 20 having a transmitter 22 coupled to the communications medium 15, a receiver 24 coupled to the communications medium 15 and the transmitter 22, a primary collision detection circuit 25 coupled to the transmitter 22 and the receiver 24, and a secondary collision detection circuit 27 coupled to the transmitter 22 and the receiver 24.

During operation of the elements of FIG. 2, the node 20 exchanges digital data with other nodes coupled to the communications medium 15. The transmitter 22 transmits a signal representing digital data onto the communications medium 15. The receiver 24 receives the signal on the communications medium 15, and converts the signal into digital data. When the transmitter 22 is transmitting, it is said to be active. When the transmitter 22 is not transmitting, it is said to be inactive. Similarly, when the receiver 24 is receiving a signal from the communications medium 15, the receiver 24 is said to be active, and when no signal is being received, the receiver is inactive.

When the network node 20 wishes to transmit data, the transmitter 22 waits until the receiver 24 is inactive, and then begins transmission (the transmitter thereby becoming active). Due to logic delays in the circuits, there is a delay between when the receiver 24 goes inactive, and when the transmitter 22 goes active. During this delay, a signal may be received on the communications medium 15, and the receiver may become active again. If the receiver 24 is active when the transmitter 22 begins transmitting, the primary collision detection circuit 25 detects the collision, and the transmission is aborted.

If the receiver 24 is inactive when the transmitter 22 becomes active, the primary collision detection circuit 25 does not detect a collision, and the transmitter 22 begins the transmission. During the transmission, the secondary collision detection circuit 27 compares the data being output by the receiver 24 with the data being concurrently transmitted by the transmitter 22. If the secondary collision detection circuit 27 finds a mismatch between the data being output by the receiver 24 and the data being transmitted by the transmitter 22, the secondary collision detection circuit 27 detects the collision, and the transmission is aborted.

Figure 3:
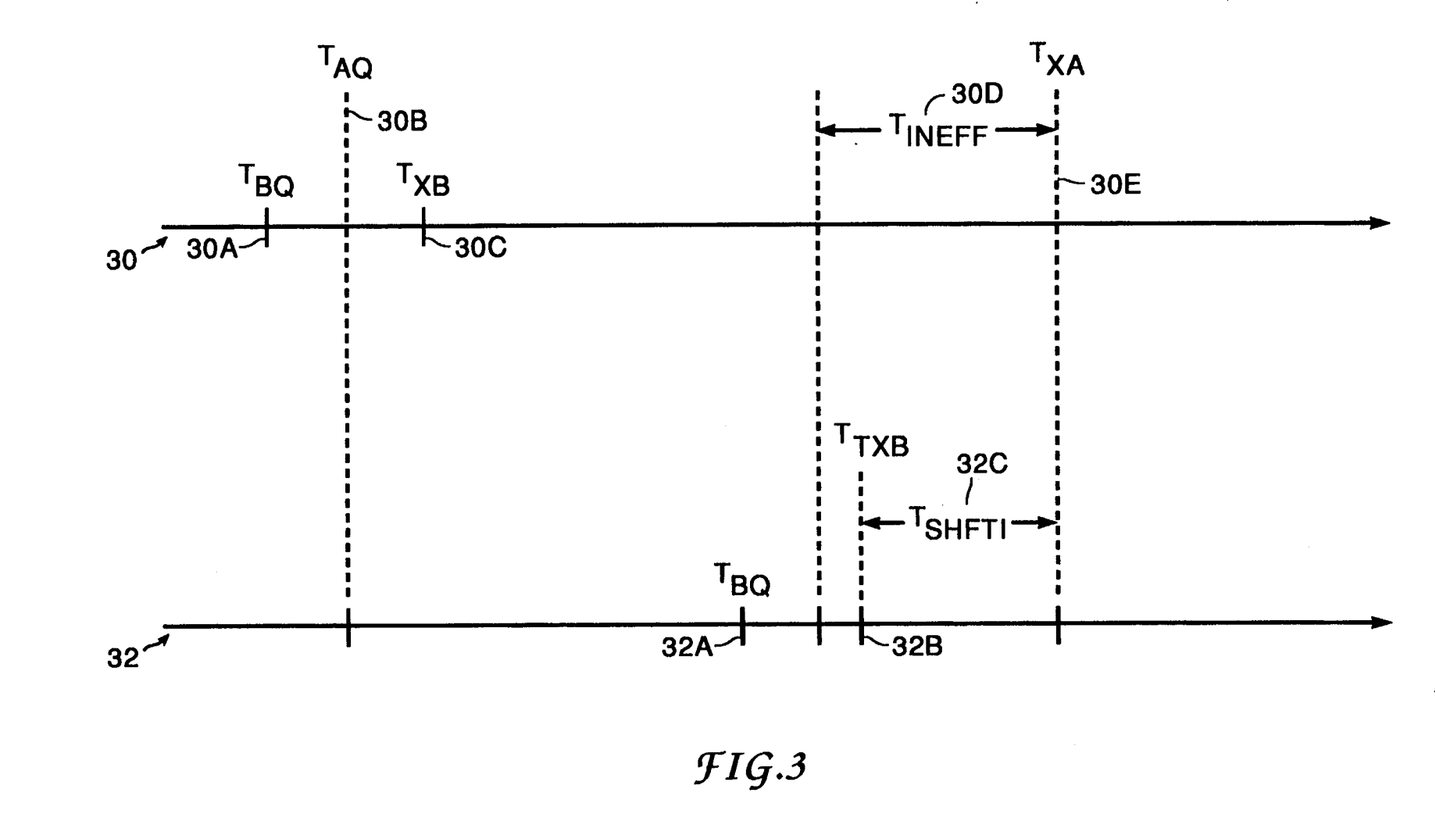
FIG. 3 is a timing diagram showing collision detection in a communications system with insignificant propagation delay.

Examples 30 and 32 in FIG. 3 are timing diagrams of events occurring in a communications network with insignificant propagation delay between nodes, where a Node B (not shown) transmits prior to a Node A (not shown). Transmissions are received by all nodes on the network simultaneously. The primary collision detection circuit ineffectiveness window ($T_{ineff}$) 30D, is a time period immediately preceding Node A's transmission, resulting from logic delays in Node A's receiver and primary collision detection circuit, during which the primary collision detection method cannot detect collisions.

Example 30 shows the case where Node B transmits prior to the ineffectiveness window of Node A's primary collision detection circuit. Node B determines the channel is quiet at time $T_{BQ}$ 30A, then Node A determines the channel is quiet at time $T_{AQ}$ 30B, and Node B transmits at time $T_{TXB}$ 30C. Node B's transmission is received by Node A at $T_{TXB}$ 30C. Because Node B's transmission is received prior to time period $T_{ineff}$ 30D, Node A's primary collision detection circuit detects the collision when Node A begins transmission at time $T_{XA}$ 30E, and Node A aborts its transmission.

Example 32 in FIG. 3 shows a collision that is undetected by the primary collision detection circuit, and which therefore must be detected by the secondary collision detection circuit. Example 32 shows the case where Node B begins transmission during the ineffectiveness window $T_{ineff}$ 30D of Node A's primary collision detection circuit. Node A determines the channel is quiet at time $T_{AQ}$ 30B, then Node B determines the channel is quiet at time $T_{BQ}$ 32A, and Node B transmits at time $T_{TXB}$ 32B. Node B's transmission is received by Node A at time $T_{TXB}$ 32B, during $T_{ineff}$ 30D, therefore Node A's primary collision detection circuit cannot detect the collision. The concurrent transmissions of the undetected collision are time shifted at Node A's receiver by the time period $T_{SHFT1}$ 32C. $T_{SHFT1}$ 32C has a potential maximum value where Node B begins transmission at the beginning of the ineffectiveness window of Node A's primary collision detection circuit. Therefore, it is seen that in communications networks with no significant propagation delay, in the case where Node B begins transmission during Node A's primary collision detection circuit ineffectiveness window, the maximum time shifting ($T_{SHFT1}$ 32C) of the colliding signals is $T_{ineff}$ 30D.

Examples 30 and 32 in FIG. 3 show that in a communications network having no significant propagation delay between nodes, the maximum time shifting that can occur between concurrent transmissions of any two nodes, where the collision is not detected by the primary collision detection circuit, is equal to the ineffectiveness window of the primary collision detection circuit.

Figure 4:
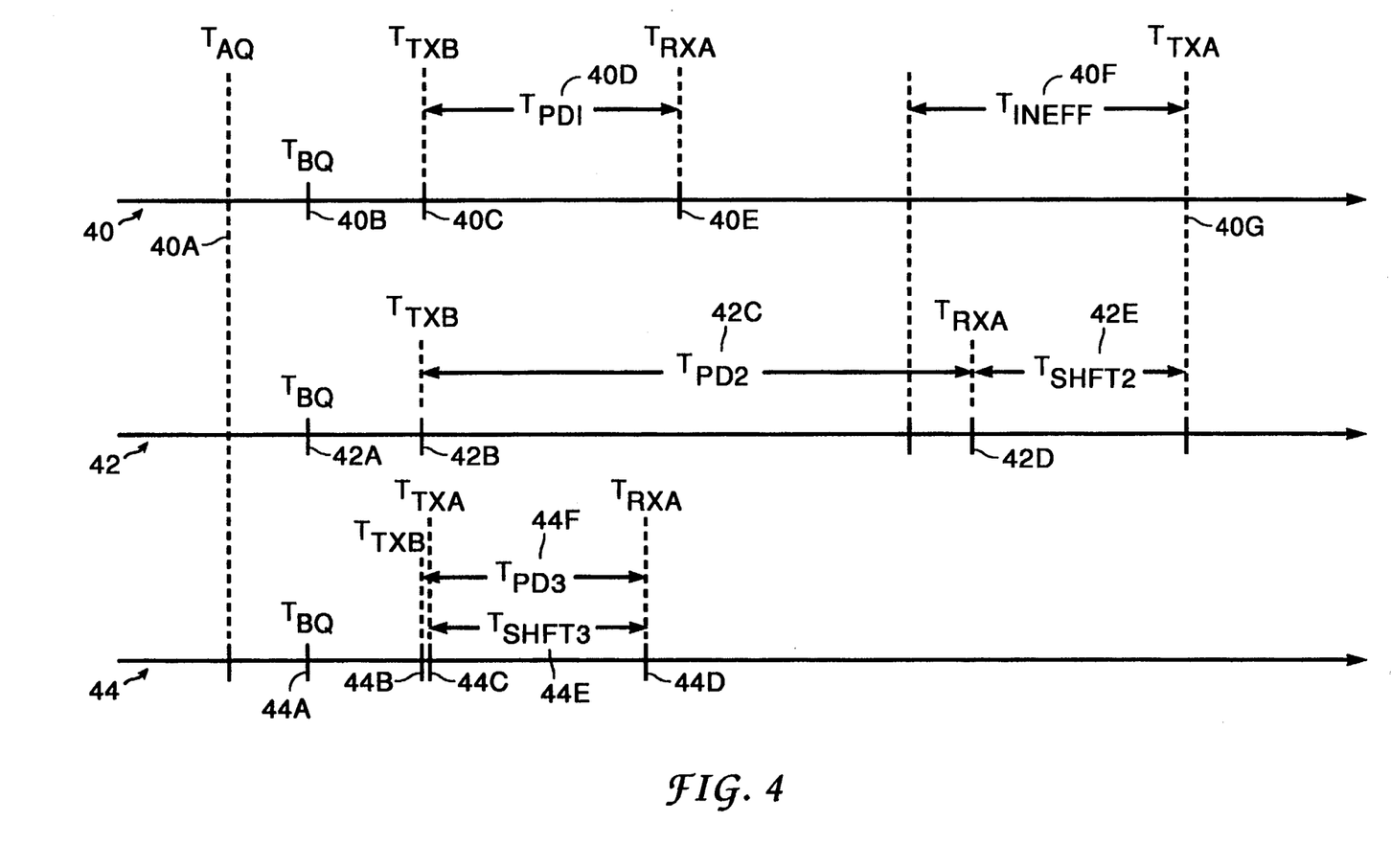
FIG. 4 is a timing diagram showing collision detection in a system with significant propagation delay.

Examples 40, 42, and 44 in FIG. 4 are timing diagrams of events occurring in a communications network with significant propagation delay between nodes, where Node B transmits before Node A. Examples 42 and 44 in FIG. 4 show collisions that are undetected by the primary collision detection circuit in Node A, and must therefore be detected by Node A's secondary collision detection circuit.

Example 40 shows the case where Node B's transmission is received by Node A prior to Node A's primary collision detection circuit ineffectiveness window $T_{ineff}$ 40F. Node A first determines the channel is quiet at time $T_{AQ}$ 40A. Node B then determines the channel is quiet at time $T_{BQ}$ 40B, and begins transmission at time $T_{TXB}$ 40C. The propagation delay between Node B and Node A is $T_{PD1}$ 40D, and Node B's transmission arrives at Node A at time $T_{RXA}$ 40E. Because Node B's transmission is received prior to time period $T_{ineff}$ 40F, Node A's primary collision detection circuit detects the collision when Node A begins transmitting at time $T_{TXA}$ 40G, and Node A aborts its transmission.

Example 42 shows the case where Node B's transmission is received by Node A during Node A's primary collision detection circuit ineffectiveness window. In Example 42, Node A first determines the channel is quiet at time $T_{AQ}$ 40A, Node B then determines the channel is quiet at time $T_{BQ}$ 42A, and Node B begins transmitting at time $T_{TXB}$ 42B. The propagation delay between Node and Node A is $T_{PD2}$ 42C, and Node B's transmission is received by Node A at time $T_{RXA}$ 42D. The colliding transmission is received within the primary collision detection circuit ineffectiveness window $T_{ineff}$ 40F, and is not detected by the primary collision detection circuit. The colliding transmissions are time shifted with respect to each other by the period $T_{SHFT2}$ 42E. The maximum time shifting that can occur on a communications network having significant propagation delay, in the case where Node B's transmission arrives at Node A during the ineffectiveness window of the primary collision detection circuit $T_{ineff}$ 40F, is therefore equal to the size of Node A's primary collision detection circuit ineffectiveness window ($T_{ineff}$ 40F).

Example 44 shows the case where, due to the propagation delay of the channel, Node B's transmission is received by Node A after Node A begins transmission. In Example 44, Node A determines the channel is quiet at time $T_{AQ}$ 40A, then Node B determines the channel is quiet at time $T_{BQ}$ 44A, and Node B begins transmitting at time $T_{TXB}$ 44B, just prior to Node A beginning transmission at time $T_{TXA}$ 44C. Because of the propagation delay $T_{PD3}$ 44F on the channel, Node A receives Node B's transmission at time $T_{RXA}$ 44D. The primary collision detection circuit in Node A cannot detect the collision, because $T_{RXA}$ 44D is after time $T_{TXA}$ 44C. The colliding transmissions are time shifted by $T_{SHFT3}$ 44E. Therefore it is seen that on a network with significant propagation delay, in the case where Node B transmits before Node A begins transmission, the maximum relative time shifting in concurrent transmissions not detected as collisions by the primary collision detection circuit is equal to the larger of either the worst case propagation delay between any two nodes in the communications system, or the primary collision detection circuit ineffectiveness window.

The maximum time shifting of concurrent transmissions not detected as collisions by the primary collision detection circuit may be expressed as a number of bits, the number being the time period divided by the bit time of the communications system. The bit time for the network is the time it takes to transmit a bit onto the network. The maximum time shifting is therefore the maximum number of bits node B's transmission can be offset, relative to the start of node A's colliding transmission, without the collision being detected by the primary collision detection method.

Figure 5:
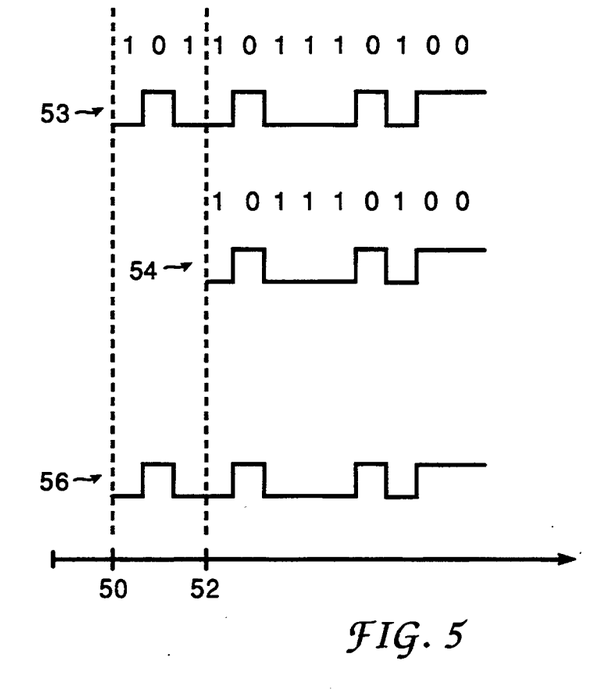
FIG. 5 is a timing diagram showing time shifting of concurrent transmissions.

FIG. 5 is a timing diagram showing how time shifting of concurrent transmissions may cause collisions of dissimilar data to go undetected by a data comparison based collision detection method, such as the secondary collision detection method. In the example, at time 50, a node A (not shown) begins transmitting data 53. Because of the propagation delay of the communications medium, node B's transmission of data 54 does not reach node A's receiver until time 52. Because the data 54 being transmitted by node B is identical to the data 53 transmitted by node A when shifted by three bits, the combined data 56 received by the receiver in node A is identical to the data 53 being transmitted by node A. As a result, the uniqueness of the colliding transmissions is lost and the secondary collision detection method cannot detect the collision.

A further problem in comparison based collision detection systems arises when the signal received by a transmitting node during a collision is a combination of multiple asynchronous colliding transmissions. The interpretation of the asynchronous colliding transmissions is unpredictable in typical collision detection systems. Asynchronous colliding signals may transition when a node is sampling the data. The interpretation of the combination signal including the transitional signal is indeterminate. Such indeterminate results cause the comparison of transmitted data with concurrently received data to be unreliable during collisions, and may result in collisions being undetected.

Figure 6:
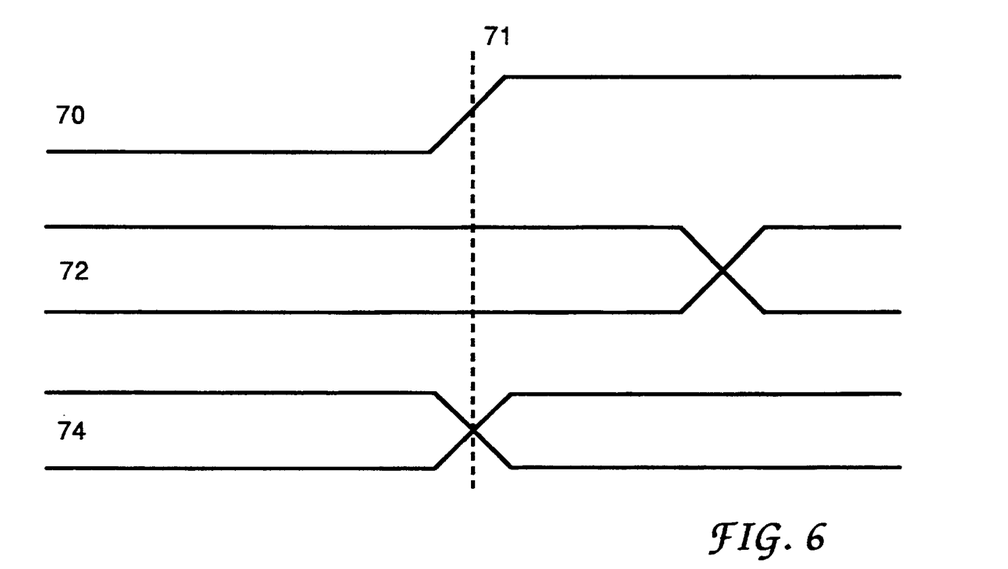
FIG. 6 is a timing diagram showing asynchronous colliding transmissions.

FIG. 6 is a timing diagram showing an example of how asynchronous colliding signals may be undetected. FIG. 6 shows a rising edge clock signal 70 defining the sampling point 71 for a first transmitting node, a signal 72 transmitted by a first node, wherein the signal 72 is stable and not in transition at the sampling point 71, and a colliding signal 74 that is in transition during the sampling point 71.

Table 1 shows the possible resulting data of the collision shown in FIG. 6, in the case where 0 is the dominant bit for a communications system, and 1 is the recessive bit The symbol 'x' indicates that the colliding data can be any value, and the symbol '→' indicates that the colliding signal was in transition during the sampling point of the transmitting node. Table 1 further indicates whether the secondary collision detection method would be able to detect the collision based on the comparison of the data transmitted by the first node, and the data concurrently received by the first node. Table 1 demonstrates that it is necessary for a transmitted recessive bit to be concurrent with a concurrently transmitted dominant bit to ensure reliable collision detection.

TABLE 1

| Transmitted Data | Colliding Data | Data Received at Transmitting Node | Collision Detected by Secondary Collision Detection Method |
|---|---|---|---|
| 0 | x | 0 | No |
| 1 | 1→1 | 1 | No |
| 1 | 0→1 | 0→1 | Maybe |
| 1 | 1→0 | 1→0 | Maybe |
| 1 | 0→0 | 0 | YES |

Figure 7:
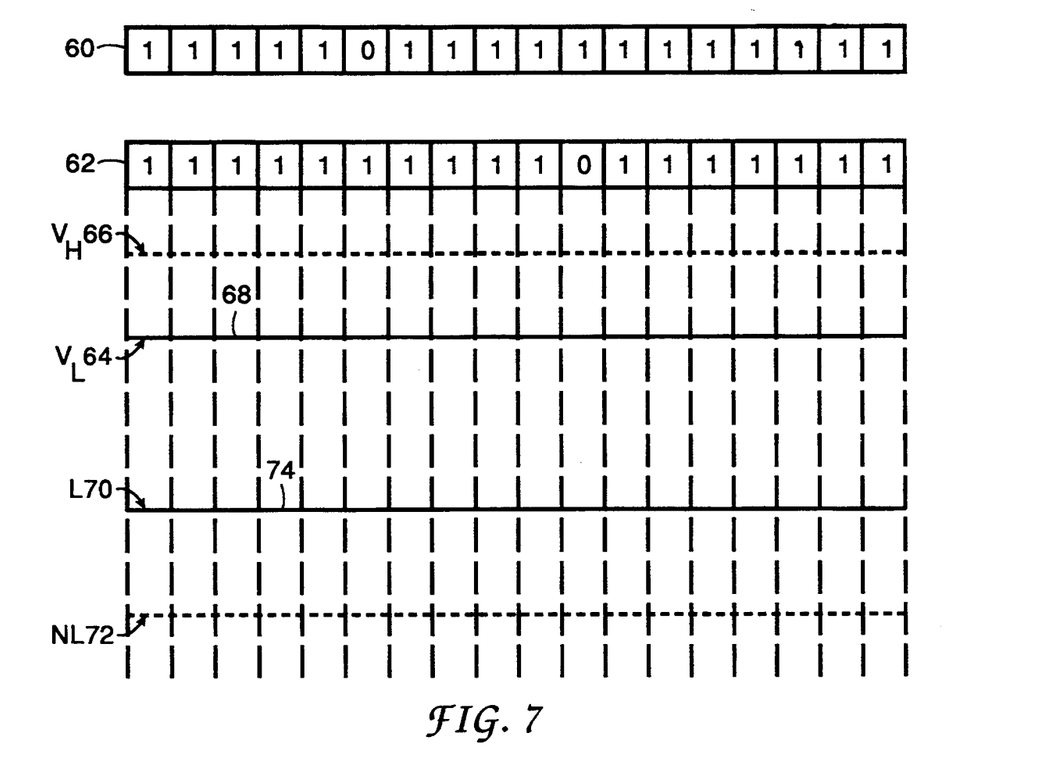
FIG. 7 is a timing diagram showing the behavior of dominant and recessive bits during collisions.

FIG. 7 shows the behavior of dominant and recessive data bits and signals during collisions. A first data transmission 60 is shown colliding with a second transmission 62. For purposes of example, in FIG. 6 a data bit '1' is transmitted as a voltage low $V_L$ 64, and data bit '0' is a voltage high $V_H$ 66. For purposes of example, voltage low is the dominant signal, and therefore the combined signal of a voltage low and a voltage high becomes a voltage low. Similarly, data bit '1' is the dominant bit, and data bit '0' is the recessive bit in the example. An example of a technology where low voltage is the dominant signal would be where open collector transmitters and receivers are used. On a common bus communications medium, all nodes on the communications medium are effectively sharing a serial line that is the logical NOR of any concurrent transmissions. Signal 68 is the result of the collision of data 60 with data 62.

Another example in FIG. 7 of a technology with dominant and recessive bits and signals is optics. With an optical transmission medium such as optical fiber, the presence of light (L 70) on the fiber is dominant, and the absence of light (NL 72), is recessive. When multiple transmissions occur on a fiber optic medium, and one transmitter is asserting light, while another transmitter is not, the result is light. The optical signal 74 is the result of the collision of data 60 with data 62. In systems where the transmission signal consists of dominant and recessive bits, asynchronous collisions may reliably be detected where the transmitting node is comparing a transmitted recessive bit with colliding dominant bits.

Figure 8:
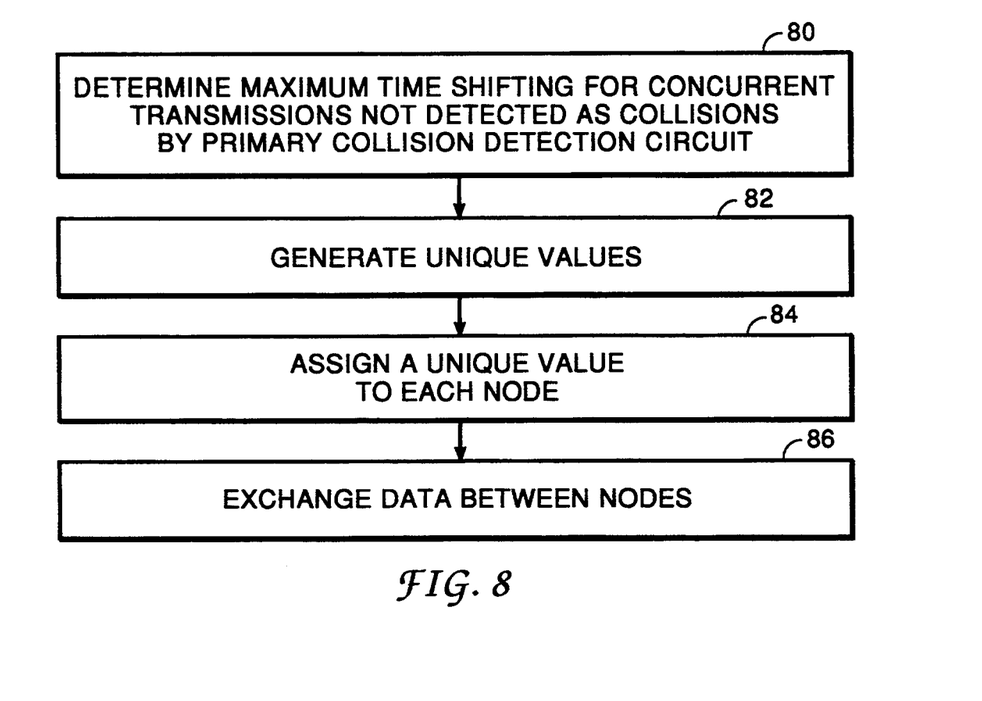
FIG. 8 is a flow chart showing a method for generating unique values for nodes in a communications system.

The method for generating the unique values for the nodes in a communications system is shown in FIG. 8. First, in step 80, the maximum time shifting possible for concurrent transmissions not detected as collisions by the primary collision detection circuit is determined. This step involves measuring or calculating the propagation delay between any two nodes within the communications system, and the ineffectiveness window of the primary collision detection circuit. Next, the maximum of the following is determined for the specific network:

(1) the ineffectiveness window of the primary collision detection ineffectiveness window for nodes on the network, (2) the maximum propagation delay between any two nodes on the network.

Second, in step 82, a set of unique values is generated so that there is a unique value for every node within the communications system. The unique value for each node has one or more recessive bits in positions within the nodes unique value. Unique values for all nodes are chosen so that at least one of the recessive bits occupies a position that, in all other unique values, contains a dominant bit, and which is surrounded by dominant bits in all other unique values, and where these properties are true, either for the same distinguishing recessive bit, or for another recessive bit within the unique value, when the unique value is shifted with respect to any other unique value, by any number of bits up to the maximum time shift for concurrent transmissions not detected as collisions by the primary collision detection circuit. In step 84, each node in the communications system is assigned a unique value. Subsequently in step 86, the communications system begins operation, and the nodes may transmit and receive data.

Figure 9:
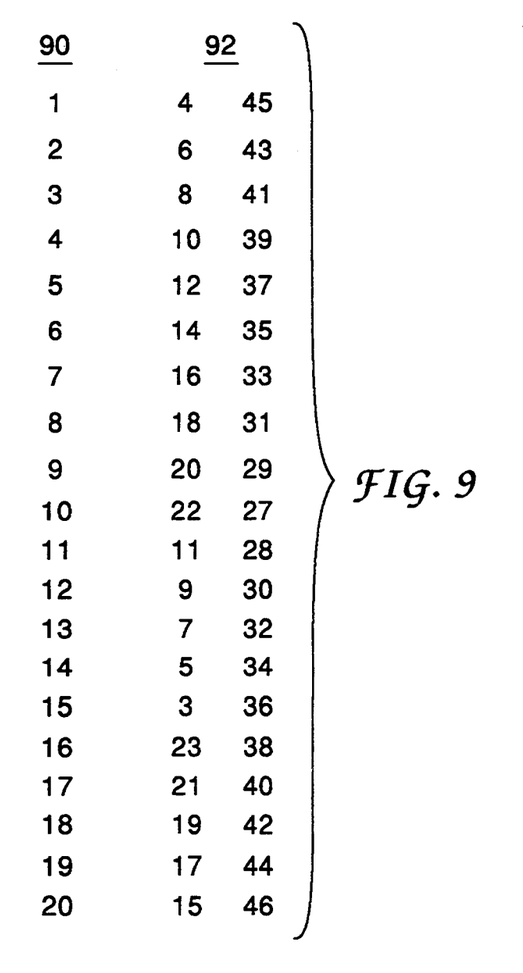
FIG. 9 is a table showing unique values for a communications system.

FIG. 9 is a table showing the placement of recessive bits within the unique values for the nodes in an example embodiment of a communications system. This example embodiment uses a 48 bit unique value as the source address of every transmission, and consists of twenty nodes. Bits within each unique value are numbered from zero (0) to forty-seven (47). Each of the addresses numbered 1-20 in column 90 have two (2) recessive bits, the locations of which are given in column 92. The primary collision detection circuit ineffectiveness window is one and one half bit times, and the propagation delay between any two nodes is less than one-half bit time. Therefore, when any two nodes transmit concurrently, and the collision is not detected by the primary collision detection circuit, the maximum time shift of the concurrent transmissions is one and one-half bit times. Rounding up to the next largest full bit time, each unique value was generated to accommodate shifts of two bite. Each unique value has a recessive bit separated from other recessive bits in any other unique value by at least one dominant bit, even when the unique value is shifted by as much as two bite relative to the other unique value. The unique values are therefore designed such that for any two concurrent transmissions, there is always a recessive bit in one of the unique values separated from every recessive bit in either of the two unique values by at least one dominant bit, even when the two unique values are shifted relative to each other by any number of bits up to the maximum time shift for concurrent transmissions not detected as a collision by the primary collision detection circuit.

Figure 10:
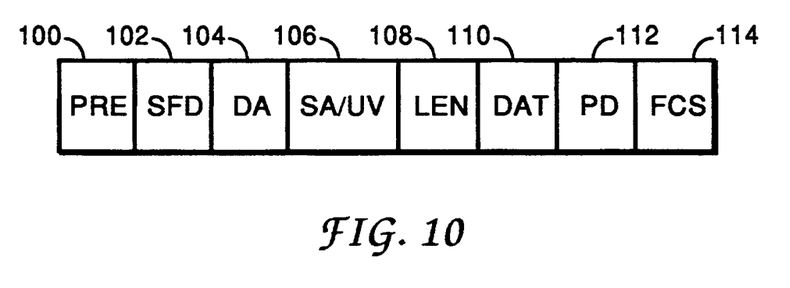
FIG. 10 is a diagram showing a packet format used to transfer data between nodes in a communications system.

FIG. 10 shows the general format of a CSMA/CD packet used to transmit data between nodes in an example embodiment of the invention. The packet includes a preamble 100, start frame delimiter 102, destination address field 104, source address/unique value field 106, length field 108, LLC data 110, pad 112, and a frame check sequence 114. During operation, the source address/unique value field 106 within each transmission contains a unique value designed in accordance with principles of the invention. The transmitting node includes the unique value as its source address in every transmission, and receives all transmissions with the unique value as a destination address. In the example embodiment, no additional circuitry is required to handle the unique value included in each transmission, and standard CSMA/CD circuits can be used for purposes of economy.

Figure 11:
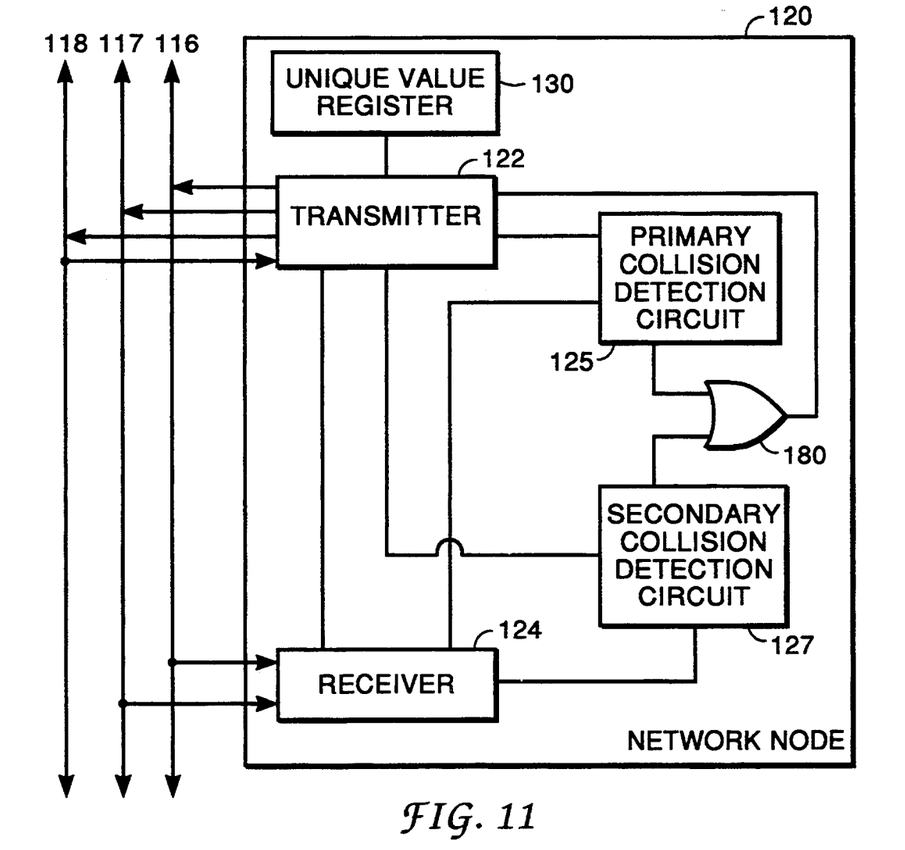
FIG. 11 is a block diagram of a network node.

FIG. 11 shows a network node 120 having a transmitter circuit 122 coupled to a network data channel 116, a network clock channel 117, and a network collision detected channel 118, a receiver circuit 124 coupled to the network data channel 116, the network clock channel 117, and the transmitter circuit 122, a primary collision detection circuit 125 coupled to the transmitter circuit 122 and the receiver circuit 124, a secondary collision detection circuit 127 coupled to the transmitter circuit 122 and the receiver circuit 124, a unique value register 130 coupled to the transmitter circuit 122, and a logical OR gate 180, coupled to the primary collision detection circuit 125, the secondary collision detection circuit 127, and the transmitter circuit 122.

During operation of the elements of FIG. 11, the node 120 exchanges digital data with other nodes coupled to the network data channel 116. The transmitter circuit 122 transmits a signal representing digital data onto the network data channel 116, including a unique value from the unique value register 130 in every transmission. The receiver circuit 124 receives the signal on the network data channel 116, and converts the signal into digital data. When the transmitter circuit 122 is transmitting, it is said to be active. When the transmitter circuit 122 is not transmitting, it is said to be inactive. Similarly, when the receiver circuit 124 is receiving a signal from the communications medium 115, the receiver circuit 124 is said to be active, and when there is no signal being received, the receiver circuit 124 is inactive.

When the network node 120 wishes to transmit data, the transmitter circuit 122 waits until the receiver circuit 124 is inactive, and then begins transmission (the transmitter circuit 122 thereby becoming active), including the unique value from unique value register 130 in every transmission. However, due to gate delays in the circuits, there is a delay between when the receiver circuit 124 goes inactive, and when the transmitter circuit 122 goes active. During this delay, a signal may be received on the network data channel 116, and the receiver circuit 124 may become active again. If the receiver circuit 124 is active when the transmitter circuit 122 begins transmitting, the primary collision detection circuit 125 detects the collision, and the transmission is aborted. In this way the primary collision detection method prevents a collision from going undetected when the receiver circuit 124 becomes active again between the time when the receiver Circuit 124 initially goes inactive, and when the transmitter circuit 122 begins transmission.

If the receiver circuit 124 is inactive when the transmitter circuit 122 becomes active, the primary collision detection circuit 125 does not detect a collision, and the transmitter circuit 122 begins the transmission. During the transmission, the secondary collision detection circuit 127 compares the data being output by the receiver circuit 124 with the data being concurrently transmitted by the transmitter circuit 122. If the secondary collision detection circuit 127 finds a mismatch between the data being output by the receiver circuit 124 and the data being transmitted by the transmitter circuit 122, the secondary collision detection circuit 127 detects the collision, and the transmission is aborted.

Figure 12:
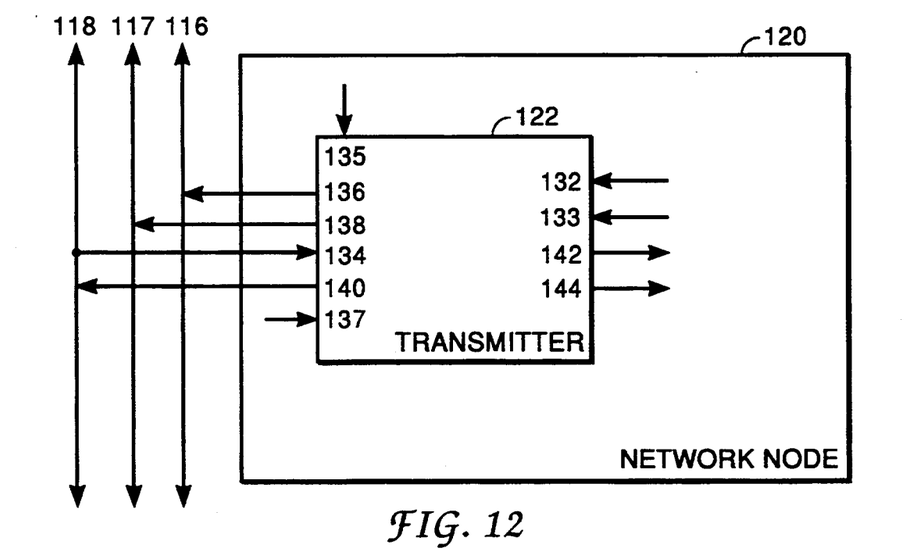
FIG. 12 is a logic diagram of an embodiment of a transmitter circuit.

FIG. 12 shows an embodiment of the transmitter circuit within a network node 120. Transmitter circuit 122 is shown having a transmit data input 132, a local collision detected input 133, a network collision detected input 134, a unique value input 135, a transmit data output 136, a receive active input 137, a transmit clock output 138, a collision announce output 140, a transmit sample output 142, and a transmit active output 144. The network collision detected input 134 and collision announce output 140 are coupled to a network collision detected channel 118, the transmit data output 136 is coupled to a network data channel 116, and the transmit clock output 138 is coupled to a network clock channel 117.

During operation, when network node 120 transmits data onto the network data channel 116, it passes data to be transmitted to the transmit data input 132. When the receive active input 137 is not active, the transmitter circuit 122 transmits the data from the transmit data input 132, along with a unique value received through unique value input 135, through the transmit data output 136 onto the network data channel 116 and through the transmit sample output 142, drives the network data clock 117 through transmit clock output 138, and asserts the transmit active output 144. If the local collision detected input 133 is asserted, the transmitter circuit 122 aborts the transmission and asserts the collision announce output 140. If the network collision detected input 134 is asserted, the transmitter circuit 122 aborts the transmission.

Figure 13:
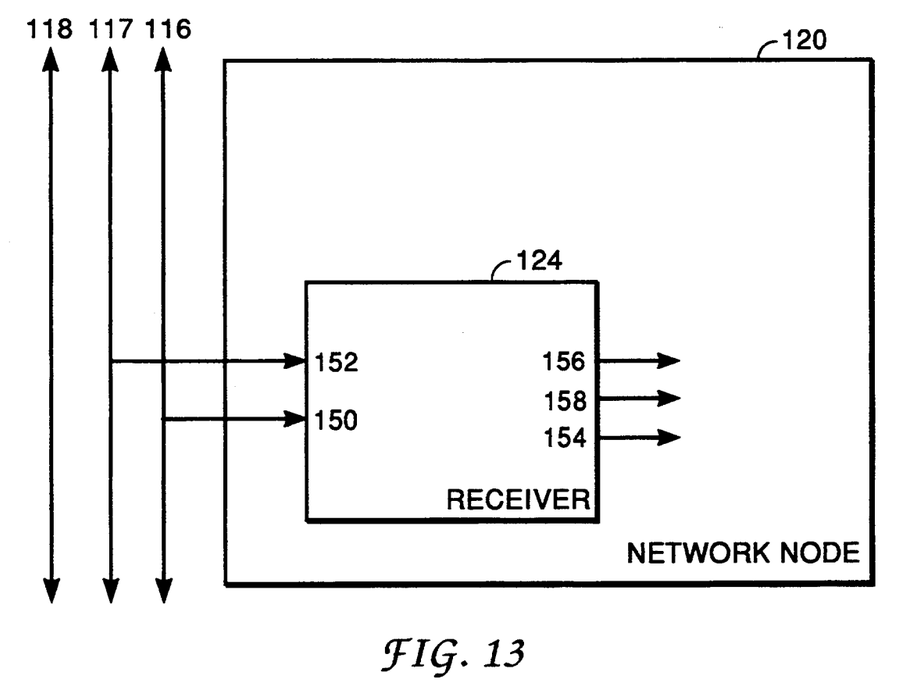
FIG. 13 is a logic diagram of an embodiment of a receiver circuit.

FIG. 13 shows an embodiment of the receiver circuit 124 within network node 120. The receiver circuit 124 is shown having a receive data input 150, a receive clock input 152, a receive sample output 158, a receive active output 156, and a receive data output 154. The receive data input 150 is coupled to the network data channel 116, and the receive clock input 152 is coupled to the network clock channel 117.

During operation, when data is detected on receive data input 150, the data is passed to receive data output 154 and receive sample output 158. The receive active output 156 is asserted while data is being received.

Figure 14:
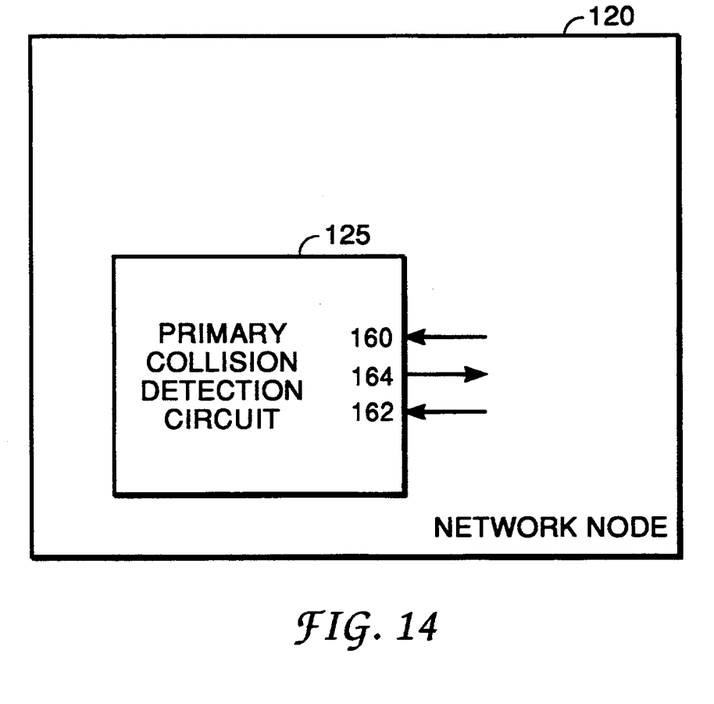
FIG. 14 is a logic diagram of an embodiment of a primary collision detection circuit.

FIG. 14 shows an embodiment of the primary collision detection circuit 125 within network node 120. The primary collision detection circuit 125 is shown having a transmit active input 160, a receive active input 162, and a primary collision detected output 164. During operation, if the transmit active input 160 becomes asserted while receive active input 162 is asserted, the primary collision detection circuit 125 asserts the primary collision detection output 164.

Figure 15:
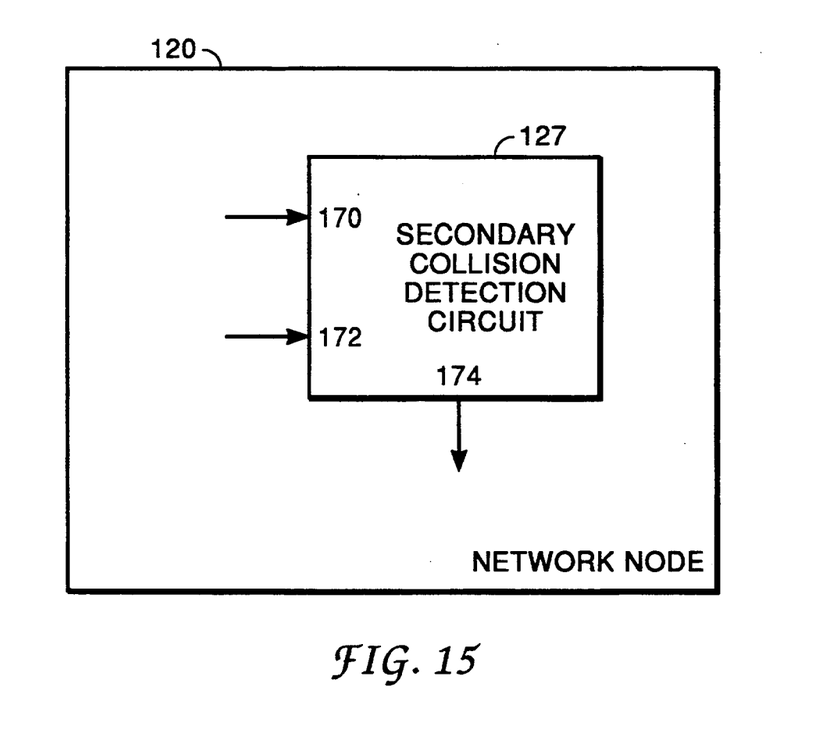
FIG. 15 is a logic diagram of an embodiment of a secondary collision detection circuit.

FIG. 15 shows an embodiment of the secondary collision detection circuit 127 within network node 120. The secondary collision detection circuit 127 is shown having a transmit sample input 170, a receive sample input 172, and a secondary collision detected output 174. During operation, if the data on the receive sample input 172 does not match the data on the transmit sample input 170, the secondary collision detection circuit 127 asserts the secondary collision detected output 174.

Figure 16:
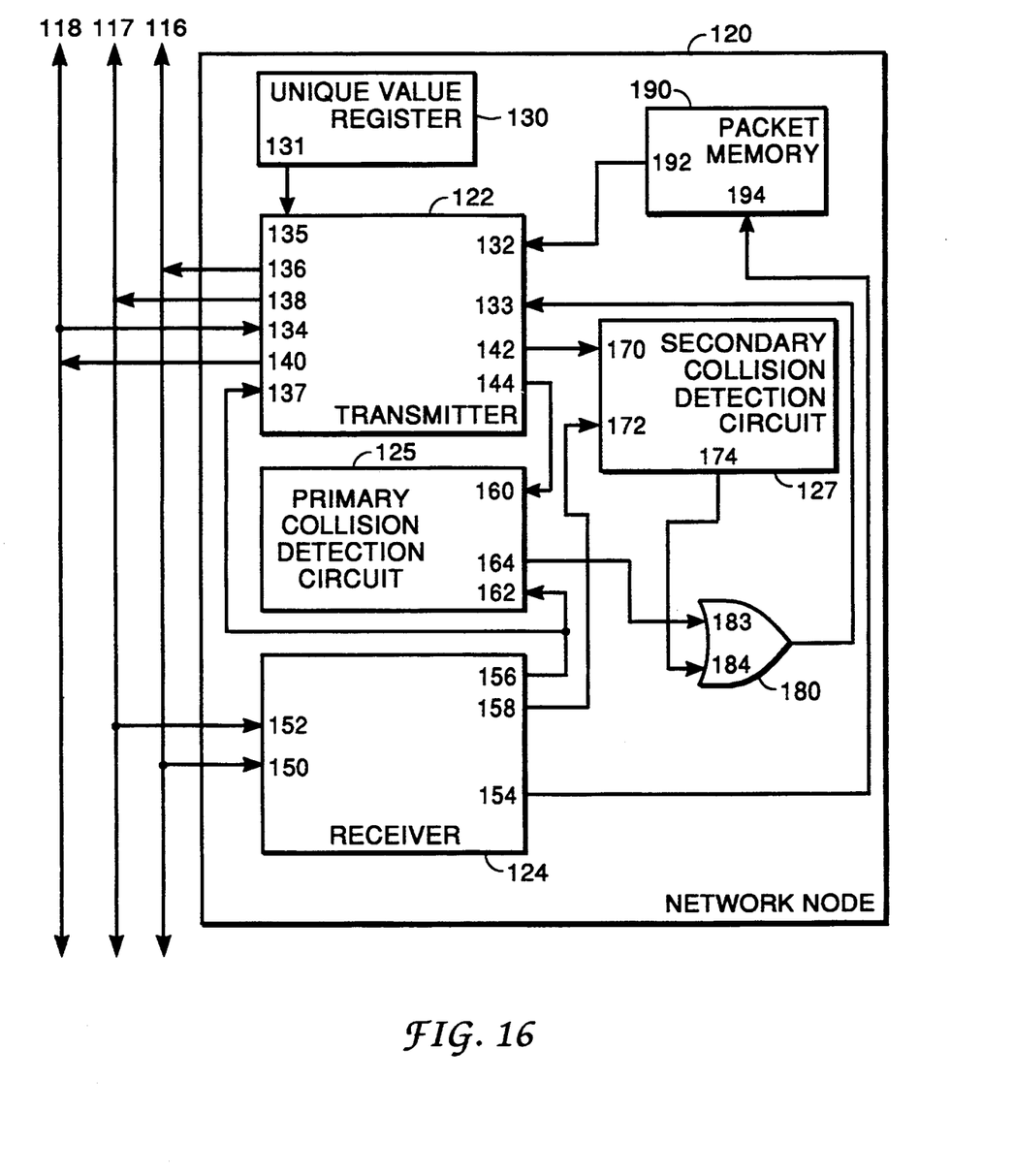
FIG. 16 is a block diagram of a network node.

FIG. 16 shows an embodiment of a network node 120. The network node 120 is shown having a transmitter circuit 122, a receiver circuit 124, a primary collision detection circuit 125, a secondary collision detection circuit 127, a unique value register 130, a packet memory 190, and a two input logical OR gate 180. A transmit data input 132 of the transmitter circuit 122 is coupled to a data output 192 of the packet memory 190, a local collision detected input 133 of the transmitter circuit 122 is coupled to a local collision detected output 186 of the two input OR gate, a network collision detected input 134 in the transmitter circuit 122 is coupled to a network collision detected channel 118, a unique value input 135 in the transmitter circuit 122 is coupled to an output 131 of the unique value register 130, a transmit data output 136 in the transmitter circuit 122 is coupled to a network data channel 116, a receive active input 137 of the transmitter circuit 122 is coupled to a receive active output 156 of the receive circuit 124, a transmit clock output 138 of the transmitter circuit 122 is coupled to a network clock channel 117, a collision announce output 140 of the transmitter circuit 122 is coupled to the network collision detected channel 118, a transmit sample output 142 of the transmitter circuit 122 is coupled to a transmit sample input 170 of the secondary collision detection circuit 127, and a transmit active output 144 of the transmitter circuit 122 is coupled to a transmit active input 160 of the primary collision detection circuit 125.

A receive data input 150 of the receiver circuit 124 is coupled to the network data channel 116, a receive clock input 152 of the receiver circuit 124 is coupled to the network clock channel 117, a receive data output 154 of the receiver circuit 124 is coupled with a receive data input 194 of the packet memory 190, a receive active output 156 of the receive circuit 124 is coupled to a receive active input 162 of the primary collision detection circuit 125, and a receive sample output 158 of the receive circuit 124 is coupled to a receive sample input 172 of the secondary collision detection circuit 127.

A primary collision detected output 164 of the primary collision detection circuit 125 is coupled to a first input 182 of the OR gate 180. A secondary collision detected output 174 of the secondary collision detection circuit 174 is coupled to a second input 184 of the OR gate 180.

During operation, when network node 120 transmits data onto the network data channel 116, the data is moved from the data output 192 of the packet memory 190 to the transmit data input 132 of the transmitter circuit 122. When the receive active input 156 is not active, the transmitter circuit 122 transmits the data from the transmit data input 132 through the transmit data output 136 onto the network data channel 116 and through the transmit sample output 142, drives the network data clock 117 through transmit clock output 138, and asserts the transmit active output 144. If the local collision detected input 133 is asserted, the transmitter circuit 122 aborts the transmission and asserts the collision announce output 140. If the network collision detected input 134 is asserted, the transmitter circuit 122 aborts the transmission.

When data is detected on receive data input 150 of the receiver circuit 124, the data is passed to receive data output 154 and receive sample output 158. The receive active output 156 of the receiver circuit 124 is asserted while data is being received from network data channel 116.

If the transmit active input 160 of the primary collision detection circuit 125 becomes asserted while receive active input 162 is asserted, the primary collision detection circuit 125 asserts the primary collision detection output 164.

During operation, if the data on the receive sample input 172 does not match the data on the transmit sample input 170, the secondary collision detection circuit 127 asserts the secondary collision detected output 174.

It is to be understood that the invention is not necessarily limited to the particular embodiment shown herein. The invention may be adapted to a wide variety of communications systems where collisions must reliably be detected. It is also to be understood that various adaptations and modifications may be made within the spirit and scope of the invention.

What is claimed is:

1. An apparatus for detecting collisions in a node for a communications system, comprising:
    a receiving means for receiving data from a communications medium, said receiving means indicating whether data is or is not being received from said medium,
    a transmitting means, responsive to said receiving means indicating data is not being received from said communications medium, for transmitting data on said medium, said transmitting means indicating whether data is or is not being transmitted,
    a first collision detection means, responsive to said receiving means indicating data is being received from said communications medium, and further responsive to said transmitting means indicating data is being transmitted, for detecting a collision when said transmitting means begins indicating data is being transmitted while said receiving means is indicating data is being received, and
    a second collision detection means, responsive to said receiving means and said transmitting means, for detecting a collision when data being transmitted is unequal to data being received.

2. A node in a communications system, comprising:
    a receiving means for receiving data from a communications medium, said receiving means indicating whether data is or is not being received from said medium,
    a transmitting means, responsive to said receiving means indicating data is not being received from said communications medium, for transmitting data on said medium, said transmitting means indicating whether data is or is not being transmitted,
    a first collision detection means, responsive to said receiving means indicating data is being received from said communications medium, and further responsive to said transmitting means indicating data is being transmitted, for detecting a collision when said transmitting means begins indicating data is being transmitted while said receiving means is indicating data is being received, and
    a second collision detection means, responsive to said receiving means and said transmitting means, for detecting a collision when data being transmitted is unequal to data being received.

3. An apparatus for detecting collisions in a node for a communications system, comprising:
    a receiving means for receiving data from a communications medium, said receiving means indicating whether data is or is not being received from said medium;
    a transmitting means, responsive to said receiving means indicating data is not being received from said communications medium, for transmitting data on said medium, said transmitting means indicating whether data is or is not being transmitted,
    a first collision detection means, responsive to said receiving means indicating data is being received from said communications medium, and further responsive to said transmitting means indicating data is being transmitted, for detecting a collision when said transmitting means begins indicating data is being transmitted while said receiving means is indicating data is being received, a second collision detection means, responsive to said receiving means and said transmitting means, for detecting a collision when data being transmitted is unequal to data being received, and a unique value, coupled with said transmitting means, consisting of recessive bits and dominant bits, having a recessive bit in a position containing a dominant bit in all other unique values for nodes on said communications system, said unique value included in each transmission from said node onto said communications medium.

4. A node in a communication system, comprising:

a receiving means for receiving data from a communications medium, said receiving means indicating whether data is or is not being received from said medium;

a transmitting means, responsive to said receiving means indicating data is not being received from said communications medium, for transmitting data on said medium, said transmitting means indicating whether data is or is not being transmitted, a first collision detection means, responsive to said receiving means indicating data is being received from said communications medium, and further responsive to said transmitting means indicating data is being transmitted, for detecting a collision when said transmitting means begins indicating data is being transmitted while said receiving means is indicating data is being received, a second collision detection means, responsive to said receiving means and said transmitting means, for detecting a collision when data being transmitted is unequal to data being received, and a unique value, coupled with said transmitting means, consisting of recessive bits and dominant bits, having a recessive bit in a position containing a dominant bit in all other unique values for nodes on said communications system, said unique value included in each transmission from said node onto said communications medium.

5. An apparatus as in claim 3 or 4, further comprising:
said transmitting means having means for transmitting said unique value in every transmission.

6. An apparatus as in claim 5, further comprising:
said transmitting means having means for transmitting said unique value in every transmission as the source address of said every transmission.

7. An apparatus as in claim 6, further comprising:
said position of said recessive bit within said unique value within each node being surrounded by dominant bits in all other unique values for nodes on the communications system.

8. An apparatus as in claim 7, further comprising:
said position of said recessive bit within said unique value within each node containing a dominant bit in all other unique values for nodes on the communications system when said unique value is shifted with respect to any other unique value, by any number of bits up to a predetermined maximum number of bits.

9. An apparatus as in claim 8, further comprising:
said position of said recessive bit within said unique value within each node being surrounded by dominant bits in all other unique values for nodes on the communications system when said unique value is shifted with respect to any other unique value, by any number of bits up to said predetermined maximum number of bits.

10. An apparatus as in claim 9, further comprising:
said predetermined maximum number of bits being equal to the maximum propagation delay between any two nodes on said communications system divided by the time required to transmit one bit over said communications medium.

11. An apparatus as in claim 10, further comprising:
said predetermined maximum being equal to the time immediately preceding the transmitting means transmitting, resulting from logic delays in said receiver means and said first collision detection means, during which said first collision detection means cannot detect collisions, divided by the time required to transmit one bit over said communications medium.

12. An apparatus as in claim 11, further comprising:
said predetermined maximum being equal to a time period divided by the time required to transmit one bit over said communications medium, said time period being the larger of either the time immediately preceding the transmitting means transmitting, during which said first collision detection means cannot detect collisions, or the maximum propagation delay between any two nodes on said communications system.

13. An apparatus as in claim 3 or 4, further comprising:
said communications medium having a network data channel, network clock channel, and a network collision detected channel, said receiving means further comprising a receive data input coupled to said network data channel, a receive clock input coupled to said network clock channel, a receive sample output, a receive active output, means for passing data received from said network data channel path to said receive data output and said receive sample output, and means for asserting said receive active output when said data is being received from said network data channel.

14. An apparatus as in claim 13, further comprising:
said transmitting means having a transmit data input coupled to said network data channel, a transmit clock output coupled to said network clock channel, a local collision detected input, a network collision detected input coupled to said network collision detected channel, a collision announce output coupled to said network collision channel, a transmit sample output, a transmit active output, means for passing data from said transmit data input onto said network data channel and said transmit data sample output, means for asserting said transmit active output when said data is being transmitted onto said network data path, means for aborting said passing data onto said network data channel when said network collision detected input is asserted, and means for aborting said passing data onto said network data channel and asserting said collision announce output when said local network collision detected input is asserted.

15. An apparatus as in claim 14, further comprising:
said first collision detection means having a transmit active input coupled with said transmit active output of said transmitting means, a receive active input coupled with said receive active output of said receiving means, a primary collision detected output, and means for asserting said primary collision detected output when said transmit active input becomes asserted when said receive active input is asserted.

16. An apparatus as in claim 15, further comprising:
said second collision detection means having a transmit sample input coupled to said transmit sample output of said transmitting means, a receive sample input coupled to said receive sample output of said receiving means, a secondary collision detected output, and means for asserting said secondary collision detected output while said transmit sample input does not equal said receive sample output.

17. A communications system comprising:
a communications medium using a dominant bit and a recessive bit; and
20 nodes connected to said medium, each node having:
a receiving means for receiving data from said medium, and indicating whether data is or is not being received from said medium;
a transmitting means, responsive to said receiving means indicating data is not being received from said communications medium, for transmitting data on said medium, and indicating whether data is or is not being transmitted;
a first collision detection means, responsive to said receiving means indicating that data is being received from said communications medium, and further responsive to said transmitting means indicating data is being transmitted, for detecting a collision when said transmitting means begins indicating data is being transmitted while said receiving means indicates that data is being received;
a second collision detection means, responsive to said receiving means and said transmitting means, for detecting a collision when said transmitted data is unequal to said received data; and
a forty eight bit unique value, included by said transmitting means in every transmission as a source address field, said unique value having recessive bits in two bit positions within said unique value, said two bit positions being one of the following pairs
4, 45
6, 43
8, 41
10, 39
12, 37
14, 35
16, 33
18, 31
20, 29
22, 27
11, 28
9, 30
7, 32
5, 34
3, 36
23, 38
21, 40
19, 42
17, 44
15, 46,

18. A method for generating unique values for a communications system, comprising the following steps:
determining the maximum time shifting possible for concurrent transmissions not detected as collisions by said first collision detection means;
generating a plurality of unique values where each unique value in said plurality of unique values comprises at least one recessive bit in a position within said unique value, said position containing a dominant bit in all other unique values in said plurality of unique values, said position surrounded by dominant bits in all other unique values in said plurality of unique values, and said unique value having at least one such recessive bit when said unique value is shifted with respect to any other unique value in said plurality of unique values, by any number of bits up to and including said maximum time shifting;
assigning each one of said plurality of unique values to each one of said plurality of nodes; and
transmitting data within said plurality of nodes.

19. A method as in claim 18, further comprising:
said step of determining the maximum time shifting including calculating the maximum time shifting size in terms of bits by dividing the maximum propagation delay between any two nodes on said communications system by the time required to transmit one bit over said communications medium.

20. A method as in claim 19, further comprising:
said step of determining the maximum time shifting including calculating the maximum time shifting size in terms of bits by dividing the time immediately preceding the transmitting means transmitting, during which said first collision detection means cannot detect collisions, by the time required to transmit one bit over said communications medium.

21. A method as in claim 20, further comprising:
said step of determining the maximum time shifting including dividing a time period by the time required to transmit one bit over said communications medium, said time period being the larger of either the maximum propagation delay between any two nodes on said communications system, or the time immediately preceding the transmitting means transmitting, during which said first collision detection means cannot detect collisions.

* * * * *